Oct. 17, 1967     S. W. SMITH     3,347,367
DOCUMENT SORTING
Filed Dec. 28, 1962     8 Sheets-Sheet 1

FIG. I.

INVENTOR
Stephen W. Smith
BY John R. Manning
ATTORNEY

Oct. 17, 1967  S. W. SMITH  3,347,367
DOCUMENT SORTING

Filed Dec. 28, 1962  8 Sheets-Sheet 3

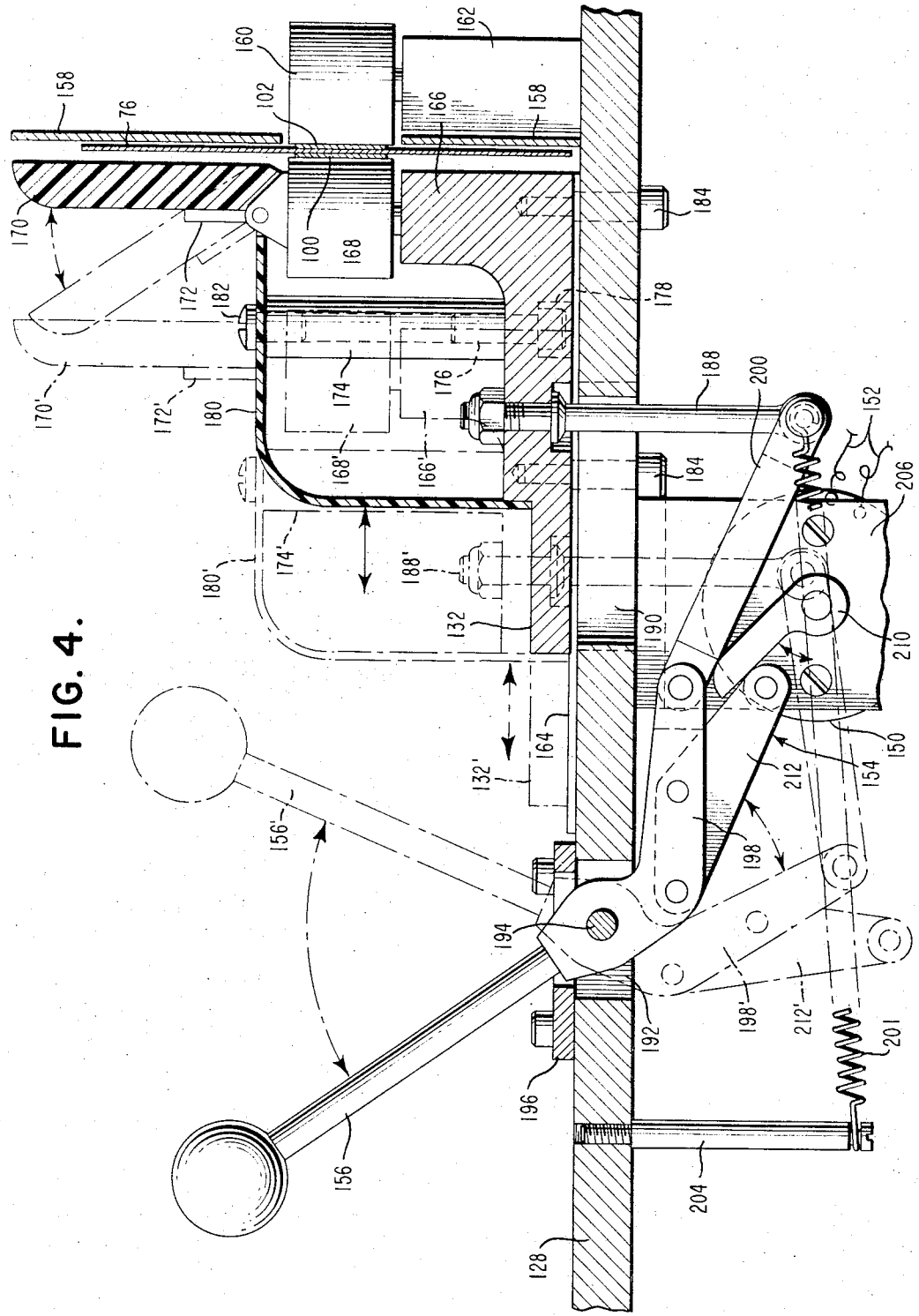

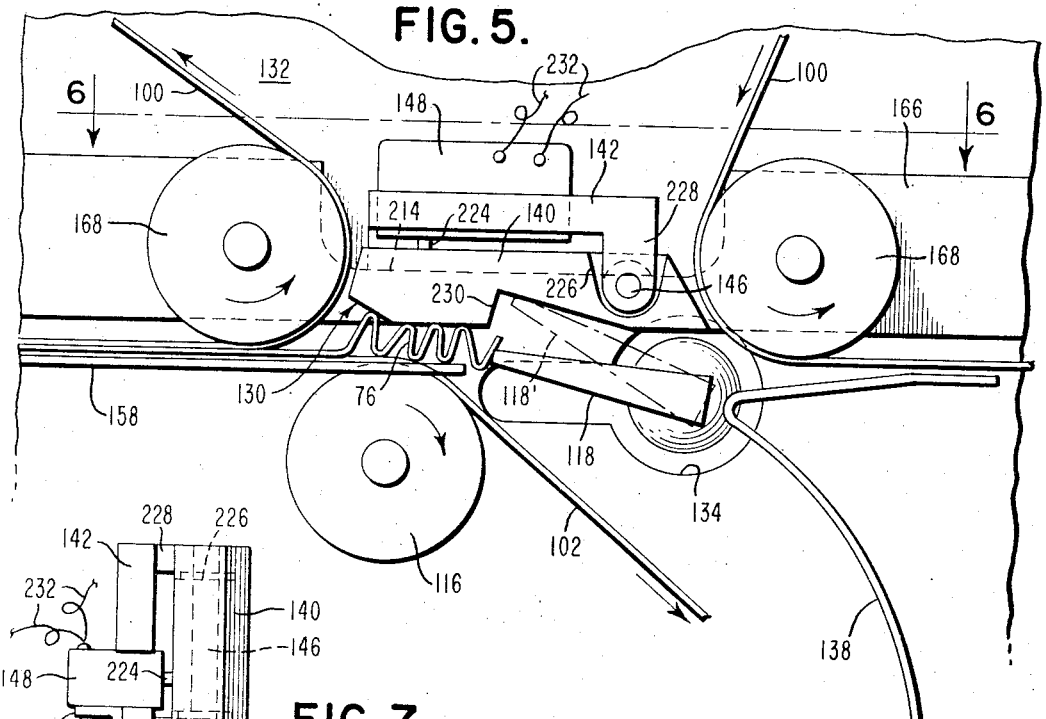
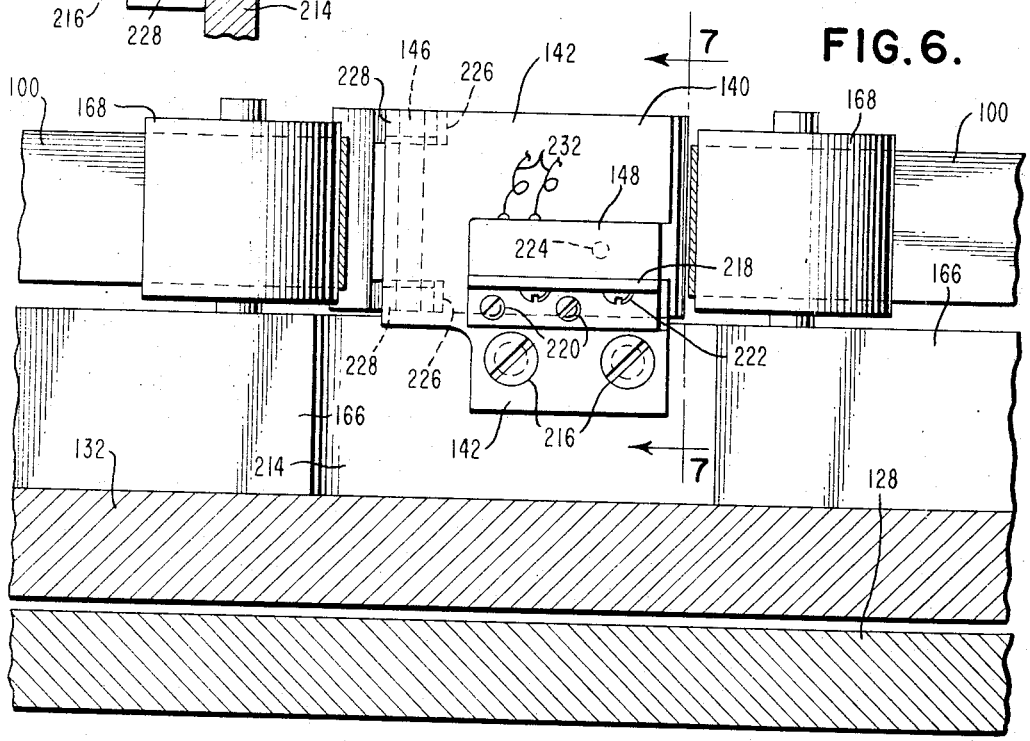

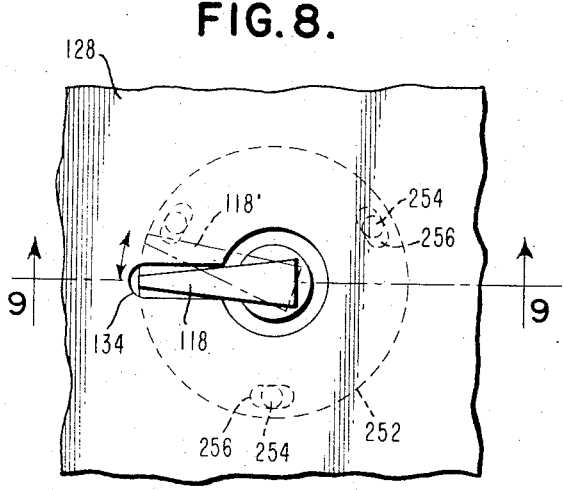
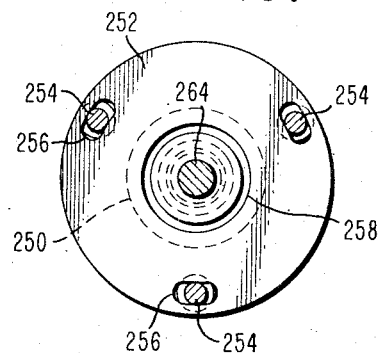
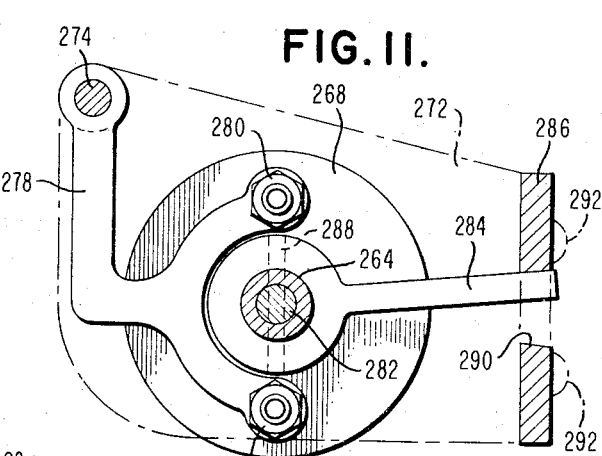
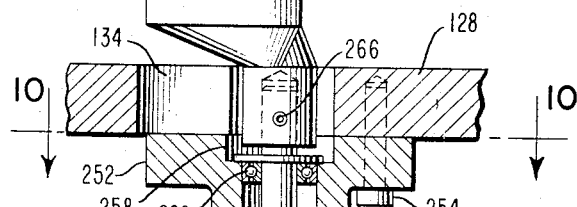
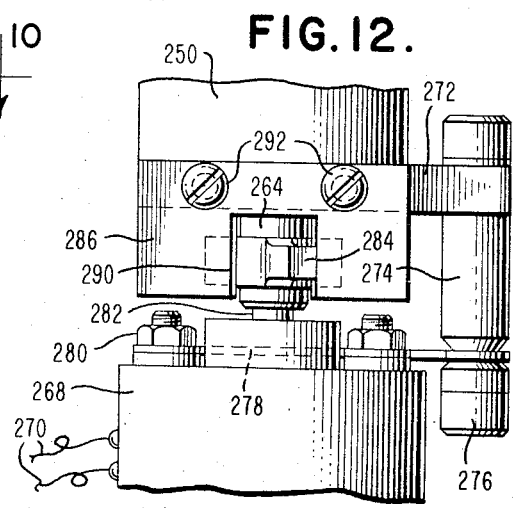

Oct. 17, 1967  S. W. SMITH  3,347,367
DOCUMENT SORTING
Filed Dec. 28, 1962  8 Sheets-Sheet 7
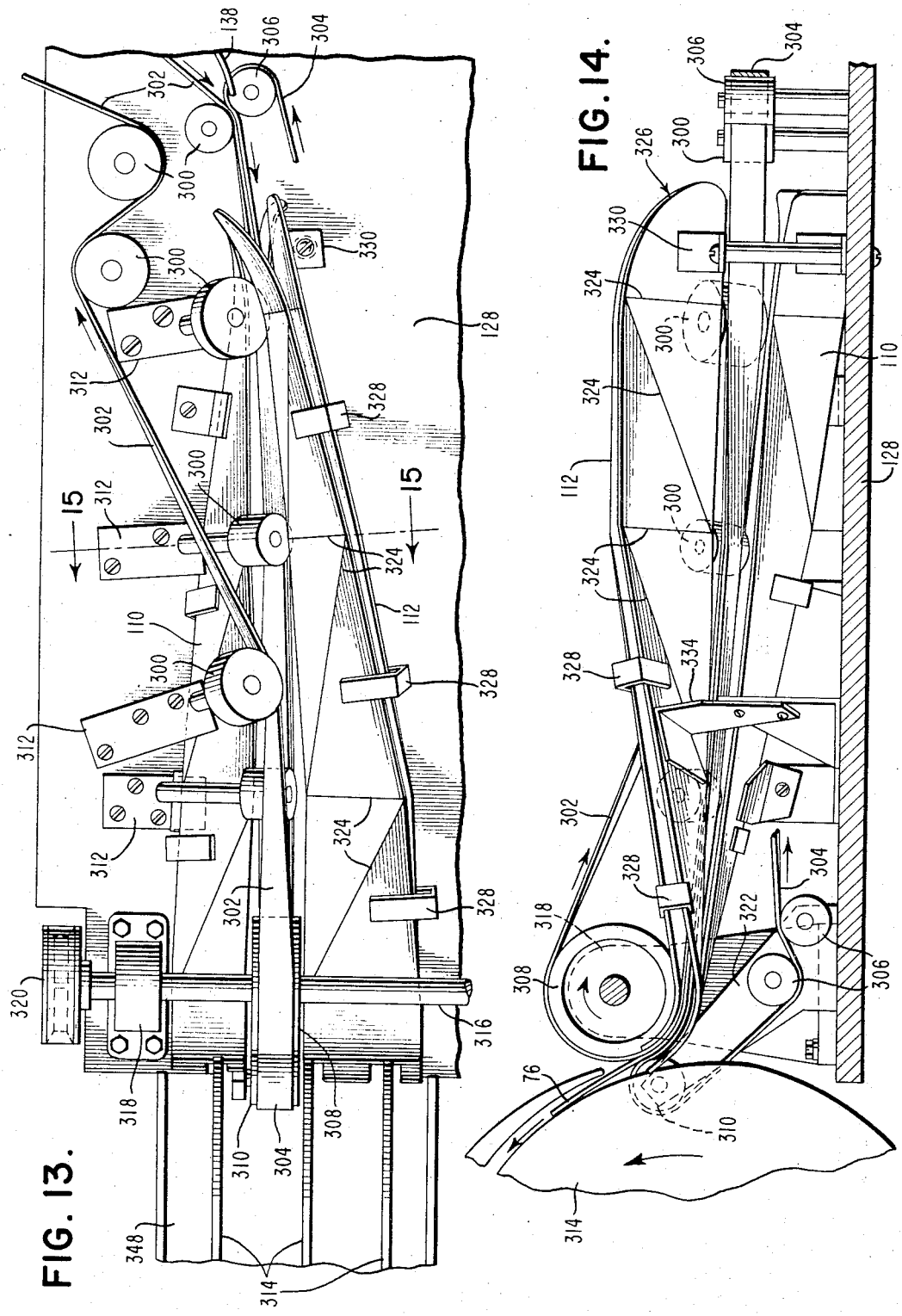

Oct. 17, 1967  S. W. SMITH  3,347,367
DOCUMENT SORTING
Filed Dec. 28, 1962  8 Sheets-Sheet 8 ns patented Oct. 17, 1967

3,347,367
DOCUMENT SORTING
Stephen W. Smith, Dallas, Tex., assignor to Sperry Rand Corporation, New York, N.Y., a corporation of Delaware
Filed Dec. 28, 1962, Ser. No. 248,090
11 Claims. (Cl. 209—74)

This invention relates to document sorting and more specifically to a high speed check sorter for directing documents to the desired output pocket according to the magnetic ink characters formed upon the face of the document.

Everyday business transactions generate voluminous numbers of business documents. As the number of business documents increased, the business concern was required to add clerical assistants to process the documents. Management soon noted that, as the processing of these documents by manual means became an almost hopeless undertaking, some machine means must be devised for processing the documents. One such business operation which has received the full impact of processing large numbers of documents is the banking industry. Bank drafts and checks are being used for the payment of goods, services, etc. to the exclusion of practically any other method of payment. The typical banking institution of the past has had to maintain a large staff of clerical assistants for the processing of these checks, drafts, deposit slips, etc. The posting of the checks and deposit slips to the customers' account or ledger cards could only be performed manually. These large staffs of clerical people were expensive to maintain; they processed documents at a relatively slow rate; and, were inefficient in that a great number of errors were committed.

Accordingly, it was necessary that some mechanical and/or electronic means be devised to quickly and accurately process the bank documents at a minimum charge or cost to the banking institution. As a result, the American Banking Association instituted a program of study to ascertain the most feasible method of relieving the banking institution of its tremendous clerical load and instituted procedures whereby bank documents could be read and sorted by mechanical and electronic means.

The ABA studied several systems which had been devised in working toward a solution to this problem. In the late 1950's, the study committee announced that it appeared that the use of human language symbols printed in magnetic ink on the documents themselves, in conjunction with equipment capable of recognizing these symbols automatically, was perhaps the most practical means for minimizing the manual handling of the documents. It was proposed that as the documents were individually and successively advanced past a magnetic reading station, the magnetic numbers formed upon the face of the check could be interpreted and the document directed to a pocket according to the magnetic code placed thereon. Thus, the Magnetic Ink Character Recognition (MICR) system was born. Fields of magnetic characters upon the document would include the bank or transit number, the depositor's account number, and the amount of the check.

As a result of this recommendation, a number of manufacturers set out to devise a check sorting system which would read the magnetic numbers formed upon the face of the check and interpret the code there formed for obtaining the sorting routine of the checks. These systems have taken many forms. It is intuitively clear, that along with the electronic circuitry for reading and interpreting the magnetic numbers formed upon the face of the check, there must be provided a mechanical means for directing the documents from the input hopper, past the magnetic reading station, and to the desired output pocket. The present invention deals principally with the mechanical means for advancing the check or document along its route for sorting.

Present day high speed check sorters may operate and sort checks at speeds of 1800 or more documents per minute. The mechanical, as well as the electrical, aspects of the sorting device take many forms. In the first instance, the documents may be removed from the input hopper by a vacuum drum, flexible belts, or vacuum picker arms. The documents are then usually advanced past a magnetic reading station, which station produces output signals for the identification and pocket assignment of the particular check to be sorted. After the magnetic symbols on the document are read at the reading station, one type of known check sorter in the art, utilizes a plurality of vanes which are actuated to receive the document and then direct the document to the output pocket. This type of operation has certain speed limitations in that a minimum of time is available for deciding or selecting the output pocket and mechanically actuating the vanes to receive the check for entrance to the output hopper. In addition, misalignment or sluggish operation of the vanes will inevitably result in check jams which are difficult to clear and, in addition, cause the mutilation of otherwise sortable documents which follow the jammed documents. The document sorter of the present invention utilizes a common document path or way wherein the documents are transported a greater distance before the decision for sorting in a particular pocket must be accomplished. A plurality of deflecting members or gates are positioned along the common document path and when actuated, will direct the document to the selected pocket. Since the time for deciding which pocket is to be selected for the particular check has been extended, greater operating speeds are attainable. Also, the possibility of mutilation and document jams has been substantially reduced.

The document sorting system of the present invention is also capable of handling documents having dimensions much larger than the usual American check. Many foreign checks may assume dimensions of four inches by eight inches or more.

Accordingly, it is desirable that a high speed check sorter be capable of operating and sorting documents at a rapid rate, be capable of sorting documents of various sizes including documents having dimensions greater than the usual American check, and operate with a minimum of "down time" due to check jams and mutilation of documents. It is in this light that the present invention has been made, eliminating many limitations inherent in previous document sorting operations.

Accordingly, it is the principal object of this invention to improve document sorters.

It is another object of the present invention to improve document sorters capable of processing bank documents, such as checks, at high rates of speed.

It is a further object of the present invention to provide a means for quickly detecting a document jammed condition.

It is a still further object of the present invention to reduce the number of document jams in a high speed document sorting system.

It is a still further object of the present invention to provide means for automatically detecting the presence of a jam which opens the document path and prevents the further feeding of documents.

It is a still further object of the present invention to provide a means for diverting documents from the common document path to an output pocket in a high speed document sorting system.

It is still another object of the present invention to provide document guide means for positioning the document received from the common document path in such a manner suitable for stacking in an output pocket.

To accomplish these and other objects, means are provided for receiving the documents to be sorted in an input hopper and for advancing the documents toward a document picker arm. As the document is presented to the picker arm, the document is swiftly and individually passed in front of a document doubles preventer and into a pair of flexible belts. The width of the belt is much less than the width of the checks so that the magnetic numbers placed on the lower face of the document may be read by a magnetic reading head positioned along the check or document way. The document is then advanced by the frictional engagement of the flexible belts to a series of document presence detectors and past a series of gates positioned along the document path. As a result of reading the magnetic characters placed upon the document, one of the series of gates will be actuated and cause the document to be diverted from a common document path to one of the secondary paths leading to an output pocket. If a jam is detected by a jam detector, then the system is inhibited and all operations stopped so that the jam can be quickly cleared. The jam detecting means are located along the document path or way and in the areas where the jam is more likely to occur. These areas are along the document path located juxtaposed the sorting gates. If a sorting gate fails to open properly, the document may strike the sorting gate and commence to crumple or tear. Other instances in which a jam may occur is when a torn document engages one of the elements, including the sorting gates, positioned along the check path such as the check guiding means, a pulley, etc. As the document commences to crumple or (accordion) it will assume a position in space wider than that permitted for a normal flat document. This crumpling of the document is detected by sensing means positioned along the document path which when actuated, will cause one side of the document path to open thus preventing further mutilation of the crumpled document and the succeeding documents. In addition, the entire sorting system may be halted.

The document diverter or gate of the present invention is of unitary construction. A movable shaft is securely mounted within a housing. The deflecting member of the gate is coupled to one end of the shaft in a cantilever manner. The opposite end of the shaft is secured to a solenoid capable of rotational movement. The solenoid is connected to the housing and appropriate stops are provided to limit the rotational movement of the shaft. The gate is biased in a closed position. Upon actuation of the solenoid, the shaft will be rotated thus causing the diverting member of the gate to be moved from its closed position to its open position. A key-shaped hole is formed in the base member of the document sorter at the position where the document is to be diverted from the common path to the belt system leading to the output document. The diverting means is inserted into this aperture with a deflecting member extending up into and next to the document path. The housing, shaft, and solenoid remain below the base member of the document sorter. Thus, if it is found necessary to remove the document diverting means, the securing means may be quickly released from their connection with the base member of the document sorter and a second gate may be inserted and so secured.

The opening of the document path is accomplished by mounting one side of the document guiding means upon a carriage or slidable plate and providing a linkage which may be actuated by a solenoid to cause the carriage to be moved outwardly and thus open the document path. Additional flexible belts are provided upon the carriage or slidable plate which form one side of the document path and are frictionally driven by the flexible belts forming the other side of the document path. In addition, means are provided for manually restoring the carriage to its position along the document path or for manually opening the document path when desired. Thus, when a jam is detected, the document path is opened which prevents further mutilation or tearing of the documents.

As a document is diverted from the common document path by the deflecting gate or member, it must be neatly stacked in its output pocket. To accomplish this, the check, which has been supported vertically on its lower edge, must be rotated 90 degrees before being presented to the stacker. This rotation of the document is accomplished by a pair of guide members which receive the check in its upright position and gently rotate the check 90 degrees while being driven by a pair of belts. Registration is maintained for orderly stacking. The guide members are of unitary construction and so positioned as to be able to accept the largest document commonly in use and capable of being sorted by a high speed document sorting system.

In addition, a decoding means is provided to receive the output from the magnetic reading station for determining the pocket assignment of the particular document. As the pocket assignment is determined, one of the document gates will be actuated, upon command, as the document approaches that gate, which operation results in a sorting routine according to the magnetic code upon the individual document.

These and other objects of this invention will be brought out more fully in the following description of an illustrative embodiment thereof, when considered in connection with the accompanying drawings, wherein like reference characters refer to like or similar parts, and in which:

FIGURE 4 is an enlarged elevation view in section of the movable carriage assembly;

FIGURE 5 is an enlarged plan view of the document gate and the document jam detecting means;

FIGURE 6 is a sectional view taken along the lines 6—6 of the FIGURE 5;

FIGURE 7 is a sectional view taken along the lines 7—7 of the FIGURE 6;

FIGURE 8 is a plan view of one of the document diverters or gates;

FIGURE 9 is a sectional view of the document diverter taken along the lines 9—9 of the FIGURE 8;

FIGURE 10 is a sectional view taken along the lines 10—10 of the FIGURE 9;

FIGURE 11 is a sectional view taken along the lines 11—11 of the FIGURE 9;

FIGURE 12 is a sectional view taken along the lines 12—12 of the FIGURE 9;

FIGURE 13 is a plan view of the document rotating and transporting means leading to the output hopper;

FIGURE 14 is an elevation view of the document transport and rotating means;

Figure 1:
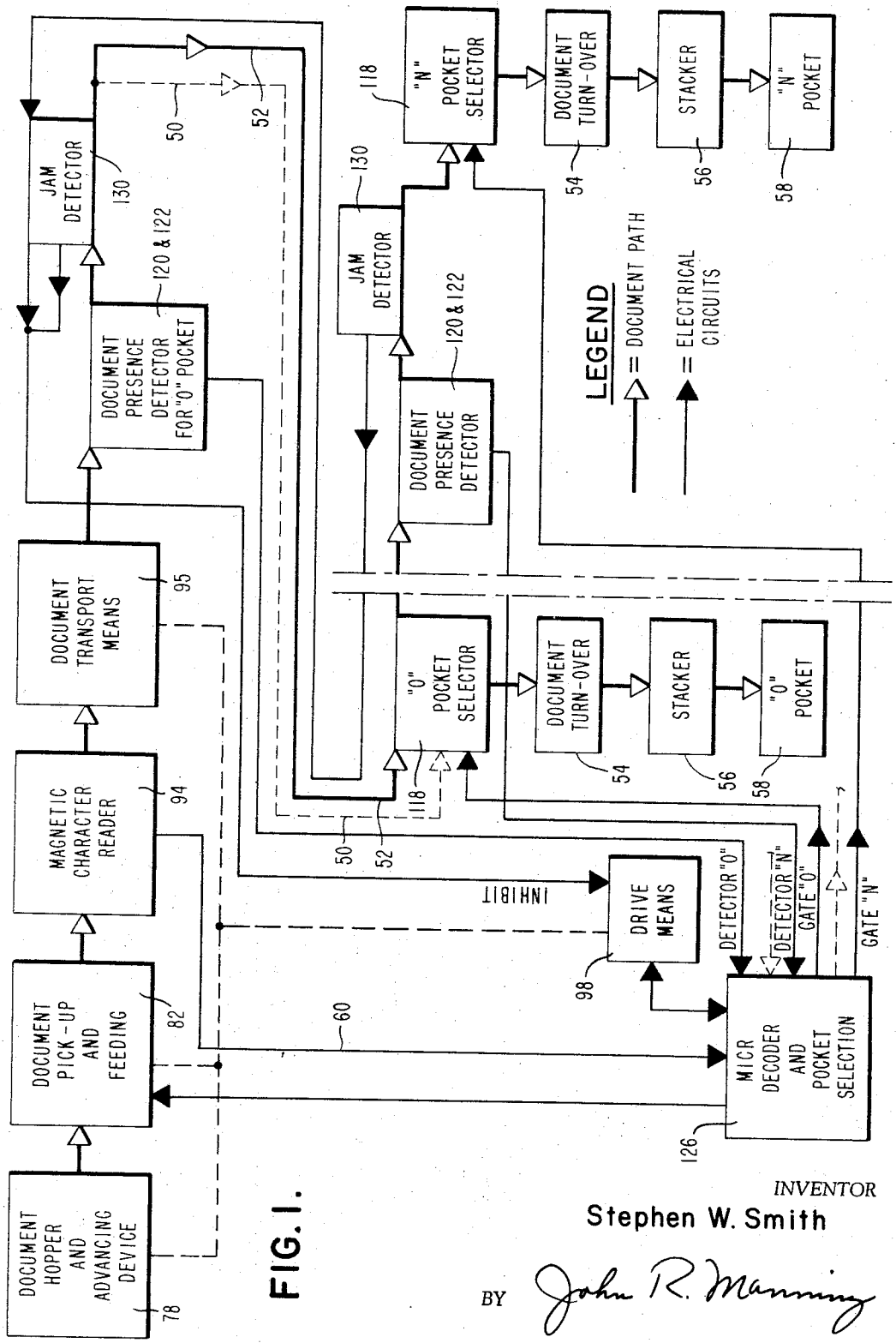
FIGURE 1 is a block diagram of the invention.

FIGURE 1 shows a block diagram of the invention. The document path is shown by the open arrows and the electrical circuits are depicted by the closed or blackened arrows. A document hopper and advancing device 78 supports the documents to be sorted and advances them to a document pickup and feeding means shown in the block 82. As the document is removed from the hopper 78 by the pickup and feeding means 82, it is advanced past a magnetic character reader 94 and along the common document path generally shown by the document transport means 95.

The document then progresses past a series of document presence detectors indicated by the block 120 and 122. With each document presence detector 120 and 122, there is associated a jam detector 130. If a document jam should occur in this area, then the jam detector 130 delivers an inhibit signal to the drive means 98 which immediately inhibits the operation of the document hopper and advancing device 78, the document pickup and feeding means 82, the document transport means 95 and the MICR decoder and pocket selection means 126.

If the particular document is to be sorted into the "0" pocket, then the first document presence detector 120 and 122 will signal the decoder 126 on the detector "0" conductor which causes the "0" pocket selector to be actuated by a signal on the gate "0" conductor. The document will then follow the dotted path indicated at 50. If the document is not to be sorted into the "0" pocket but some other pocket, then the decoder 126 will ignore the signal from the first document presence detector 120 and 122 and the document will follow the path indicated by the conductor 52. If the "0" pocket is to be selected, then the gate associated with the "0" pocket selector 118 will be actuated by a signal from the decoder and pocket selection means 126 thus causing the document to be diverted from the common document path; to a document turnover or rotating device 54 which rotates the document 90 degrees, to a stacker 56 which serves to retard the speed of the document and to stack the document in the "0" pocket 58. If the "0" pocket is not the sorting routine for the particular document, then the document continues on past a plurality of document presence detectors 120 and 122, jam detectors 130, and pocket selectors 118, until the decoder and pocket selection means 126 recognizes the presence signal generated by the document presence detector 120 and 122 associated with the desired pocket and then causes actuation of the particular pocket selector 118 to result in placing the document in the desired pocket. As the document turnover means 54, stacker 56, pockets 58, pocket selectors 118, document presence detectors 120 and 122, and jam detectors 130, are all similar in construction and function, they are designated by similar numerals.

The Magnetic Ink Character Recognition (MICR) decoder and pocket selection device 126, receives the output of the magnetic character reader 94 on the conductor 60. The signal received by the decoder 126 from the magnetic character reader 94 is interpreted in the decoder 126 to ascertain the correct pocket assignment for the document passing the character reader 94. The decoder and pocket selection means 126 then determines the pocket to be selected and remembers the pocket assignment until the document presence detector 120 and 122 associated with the particular pocket is reached. At that time, the decoder 126 generates a signal on the gate conductors which causes the desired pocket selector to be actuated which results in the desired sorting routine. The decoder and pocket selection means 126 may contain an operator's control panel and for this reason communicates with the drive means 98 and the document pickup and feeding means 82.

The sorting system will now be referred to in detail.

Figure 2:
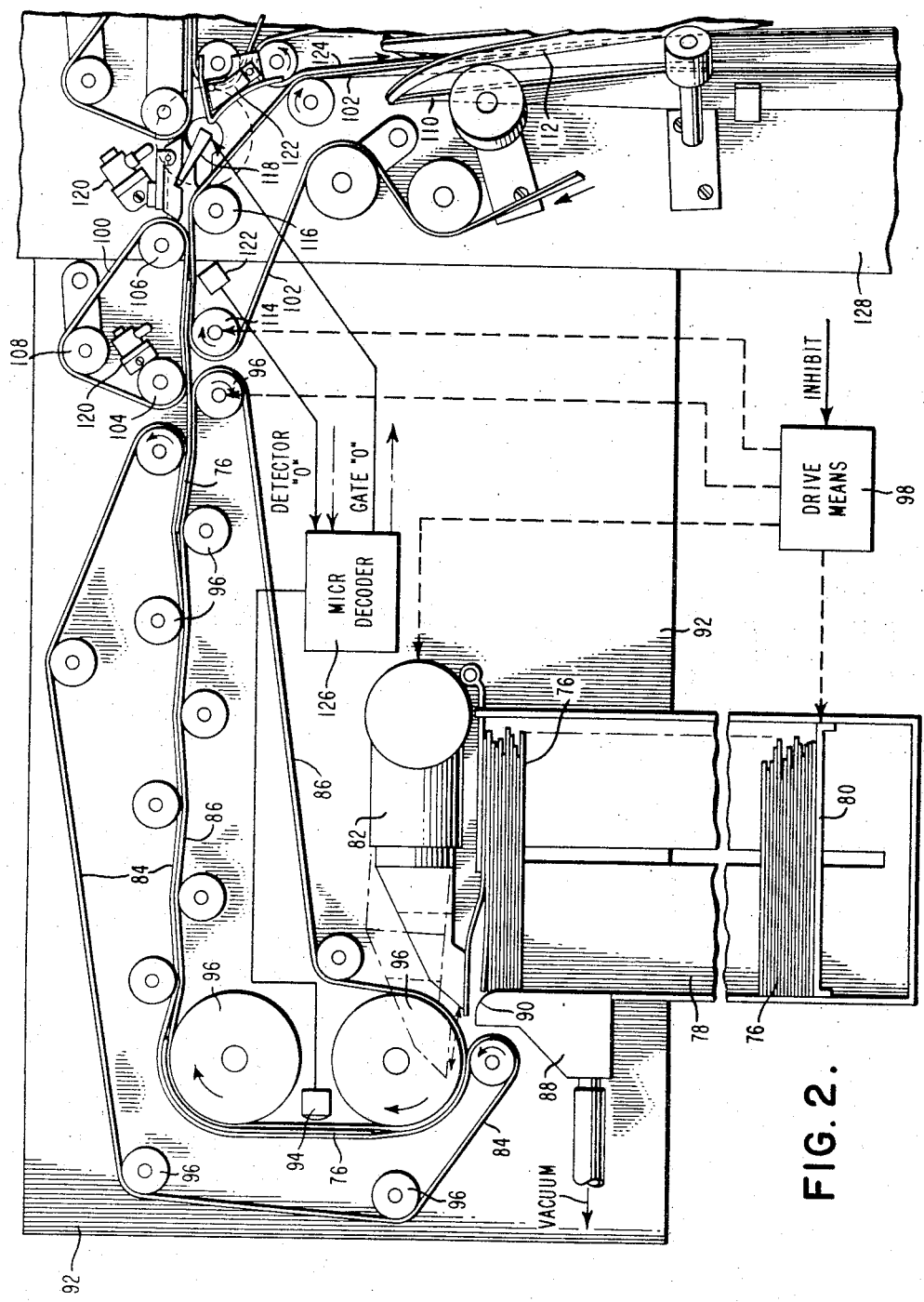
FIGURE 2 is a plan view of the sorting system.

As shown in the FIGURE 2, the documents or checks 76 are placed in an input hopper 78. A backup plate 80 is positioned against the last document in the stack for advancing the documents toward a picker arm 82, at a rate determined by the speed at which the documents are removed from the input hopper 78. The picker arm 82 may be of a vacuum type that oscillates in the manner shown for advancing the first document in the stack toward the feed belts 84 and 86.

As the picker arm 82 advances the document toward the feed belts 84 and 86, the document 76 passes a vacuum doubles preventer 88 which serves to inhibit the feeding of any double documents by holding the double document at the entrance 90 of the vacuum doubles preventer 88. All of the foregoing elements may be mounted upon a suitable base member such as the base plate 92.

The documents 76 presented by the picker arm 82 to the flexible feed belts 84 and 86, are advanced past a magnetic reading head 94, which magnetic reading head 94 is positioned adjacent the document path formed by the feed belts. The feed belts 84 and 86 are mounted and driven by a plurality of pulleys 96 which form the document path or way. The flexible belts 84 and 86 serve to accurately and quickly transport the document past the magnetic reading head 94 and to the common document path along which the deflecting members or gates are positioned. The pulley 96 may be driven by any suitable drive means such as the driving means 98 and this rotational movement results in the advancement of the flexible feed belt 86. The flexible belt 84 is positioned in frictional engagement with the belt 86 and the motion of the belt 86 is transmitted to the belt 84. As documents 76 are injected between the belts 84 and 86, a motion of the documents 76 results which corresponds to the document path formed by the feed belts. The belts 84 and 86 are much narrower in width than the width of the document. For example, in an embodiment of the invention which was operated and constructed, the feed belts were approximately 1 inch wide.

As shown in the FIGURE 2, two documents 76 are shown being transported by the belt system. One of the documents 76 is shown passing in front of the magnetic reading head 94 and the other document is shown emerging from the document path and into the sorting area. The sorting area is shown at the right side of the FIGURE 2 and in detail in the FIGURE 3.

The sorting area will be discussed in detail in reference to the FIGURE 3; however, as shown in the FIGURE 2, the documents are advanced by other flexible belts such as the upper flexible belt 100 and the lower flexible belt 102. The flexible belt 100 has the pulleys 104 and 106 positioned along the document path and the pulley 108 is positioned away from the document path in such a manner that the pulleys 104, 106, and 108 form a triangular configuration. The pulley 108 is mounted upon the base member 92 in such a manner that adjusting means for providing the proper tensioning of the belt may be accomplished.

Figure 16:
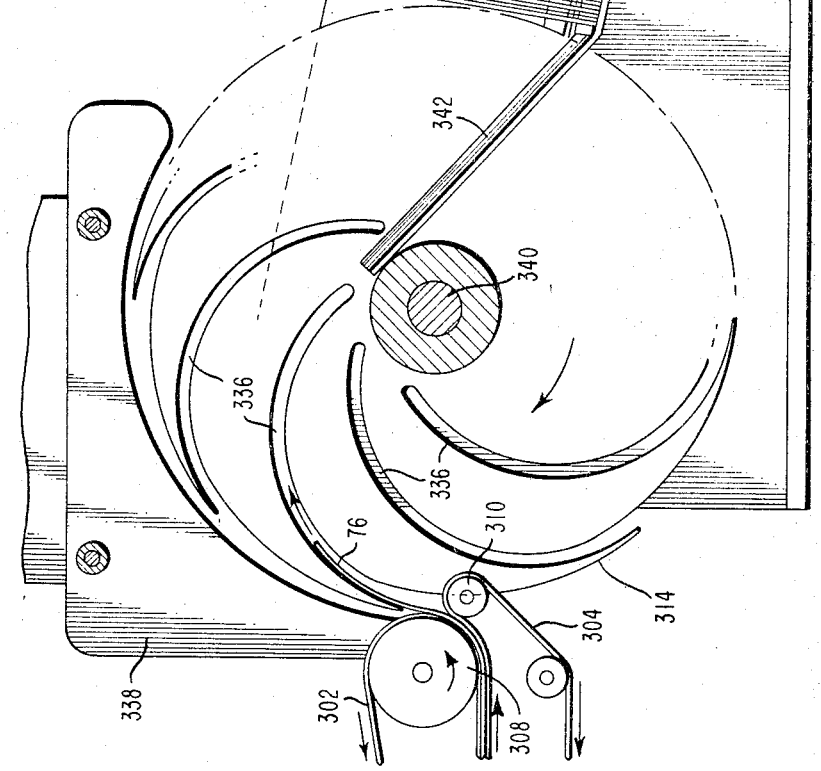
FIGURE 16 is an elevation view of the document stacker and the output hopper.

The lower belt 102 passes along the document path near and in engagement with the belt 100 and extends on through document turnover devices 110 and 112 to an output hopper of FIGURE 16. The pulleys 114 and 116 are positioned along the document path and the pulley 114 drives the flexible belt 102 from the drive means 98. Since the belt 102 is in frictional engagement with the belt 100, the belt 100 is also driven.

Positioned along the document path are a plurality of deflecting members or gates 118, one of which is shown (in an opened position) in the FIGURE 2.

Positioned between and within the triangular area formed by the pulleys 104, 106 and 108 is a light source 120. Light from the light source 120 will impinge upon a photo pickup tube 122 positioned on the opposite side of the document path as the light source 120. As a document breaks the light path between the light source 120 and the photo pickup device 122, the change in signal from the photo pickup device 122 may be utilized to actuate the deflecting member or gate 118 which diverts the document from the common document path into the path formed by the belt 102 and a belt 124.

As noted, the drive means 98, which may be an electric motor or other device, will drive the backup plate 80 to advance the documents toward the picker arm 82; will rotate and cause the desired motion of the pickup arm 82 at a repetitive cycle equal to the desired sorting speed; will drive the belt system formed by the initial feed belts 84 and 86; will drive the belt 82 through the pulley 114 of the secondary belt system; the stacker of the FIGURE 16, and, all remaining belt systems throughout the system for advancing the documents. In the case of a document jam or other condition wherein it is desired to inhibit the operation of the system, a signal on the inhibit conductor to the drive means 98 will quickly stop the motion of the drive means and the resulting linkages coupled thereto.

As shown in the FIGURE 2, the MICR (Magnetic Ink Character Recognition) decoder 126 may be of the type shown in copending application Serial No. 114,784, filed June 5, 1961, entitled "Null Dependent Symbol Recognition," and assigned to the same assignee as the present invention. The purpose of the decoder 126 is to receive the output signal from the magnetic reading head 94 and according to the signal received, determine the pocket assignment of the check or document to be sorted. If, for example, as shown in the FIGURE 2 the gate "0" is to be selected, then the document detector "0" formed by the first set of means including the light source 120 and the photo pickup device 122 will signal the arrival of the document 76 at that point by a decreased output from the pickup device 122. The decoder 126 then utilizes this output from the pickup device 122 to actuate the gate 118 on the gate "0" conductor at the appropriate time to cause the document 76 to be diverted from the common document path into the feed path formed by the belts 102 and 124. As soon as the document has been diverted, the gate "0" signal to the gate 118 disappears and the gate 118 rotates in a counter-clockwise manner to remove itself from the common document path. Document jam detection means are provided along the common document path which will be discussed in detail with reference to the FIGURES 3, 5, 6 and 7.

Figure 3:
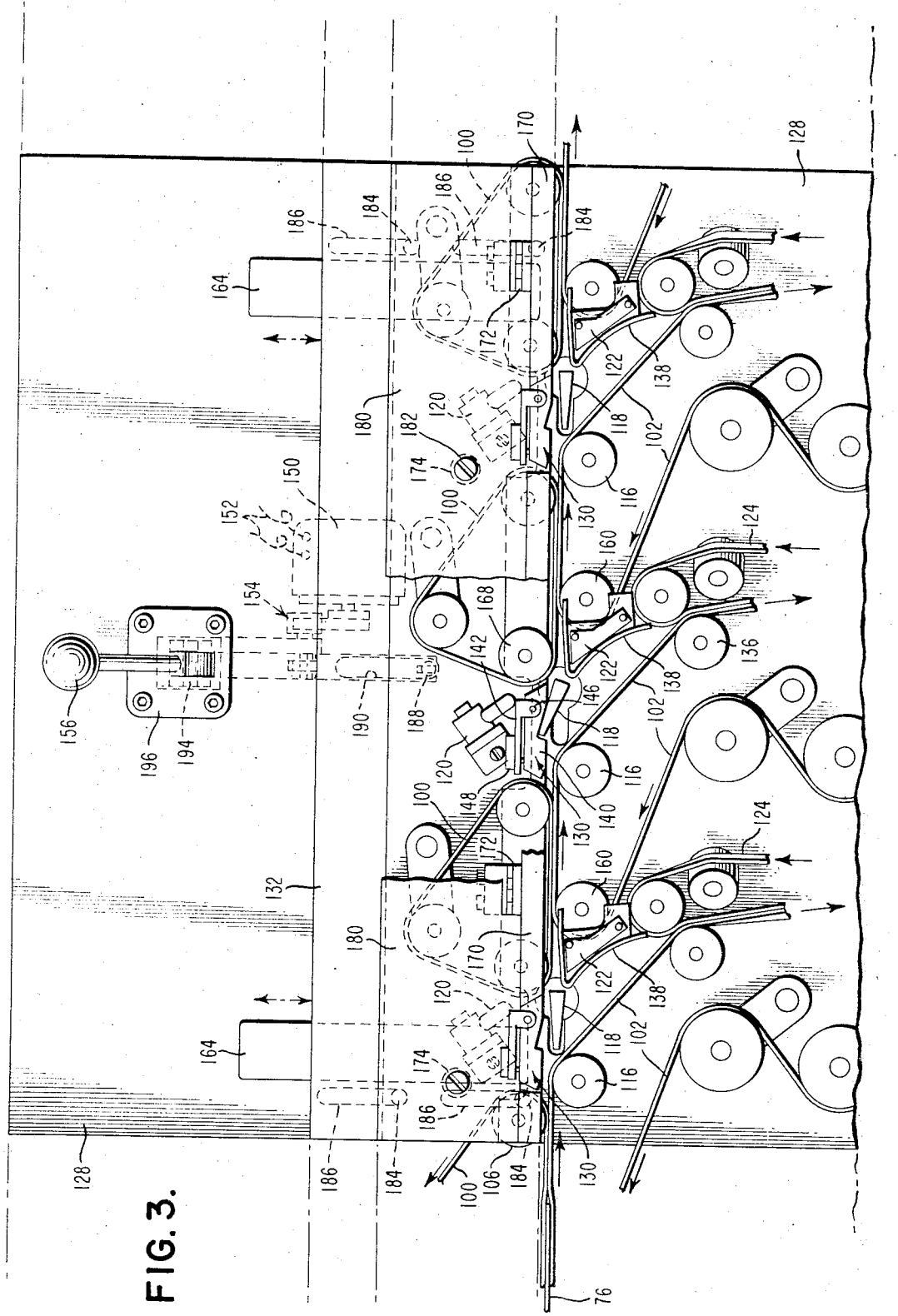
FIGURE 3 is a plan view of the document sorting gates and the movable carriage assembly forming one side of the document path.

In the FIGURE 3, the documents 76 enter the sorting mechanism as shown and advance in the direction indicated by the arrows. The document path past the deflecting members or gates 118 is known as the common document path. The secondary or output document path projects from the common document path and when the gate or deflecting member 122 corresponding to the output document path is actuated, then the document 76 is deflected into the output document path and stacked in an output hopper of the FIGURE 16. The device is constructed in such a manner that one side of the document path can, upon command, move rearwardly and thus open the document path. This movable carriage will prevent further mutilation of the documents in the case of a jam and also provide means for easily removing the jammed document. Three such sections or a carriage and including three gates 118 and three output document paths, are shown in the FIGURE 3; however, it will be understood that any number of selections may be shown and in the particular embodiment that was constructed, it was found that three such sections could be conveniently mounted upon a movable carriage or plate which would move away, upon command, and open the document path.

The elements of the FIGURE 3 will now be discussed in detail. In this figure, three secondary paths are shown leading from the common document path which the document 76 is shown as entering. Since the secondary paths and elements associated therewith are similar in each of the three areas, only the center area will be described in detail. The elements associated with the first secondary document path were discussed generally during the discussion of FIGURE 2. The document transporting elements forming the secondary paths to the output pockets are mounted upon a base member 128. These are the elements shown below the common document path. The elements above the common document path and comprising the light sources 120, the jam detectors 130, and the rollers forming a triangular belt are mounted on a movable carriage or member 132. The movable member 132 and the elements mounted thereon will be described in detail with reference to the FIGURE 4 hereinafter.

In the FIGURE 3, the deflecting members or gates 118 are positioned along the common document path. A key-shaped aperture 134 is formed in the base member 128 to receive the gate 118. The gate 118 is assembled and inserted from underneath the base member 128 with the deflecting portion of the gate extending along side the document path while the actuating solenoid (not shown) and its associated supporting members remain below the surface of the base member 128. The deflecting gate 118 in the middle area of the FIGURE 2 is shown in its open or extended position to deflect a document while the remaining two gates are shown in their closed or non-deflecting positions. As shown in the center portion of the FIGURE 3, a pulley 116 is positioned along the common document path while a pulley 136 is positioned away from the common document path in such a manner that the belt 102 which passes over the pulleys 116 and 136 forms an angle of approximately 45 degrees away from the common document path. A V-shaped deflecting member 138 has one of its extensions extending along the common document path while the other extension of the V-shaped member 138 is positioned along the section of the belt 102 formed across the pulleys 116 and 136. This section of the member 138 serves to force the document into engagement with the belts 102 and 124 after the gate 118 has deflected the check or document into this pocket. Various other pulleys are positioned on the base member 128 to direct the deflected document to its associated output hopper.

Within the V-shaped deflecting member 138 is mounted a photo pickup device 122. An aperture is provided in the V-shaped deflecting member 138 to permit light from the light source 120, which element is positioned on the movable carriage or member 132, to be picked up by the photo pickup device 122. It will be noted that because of the angular arrangement of the light source 120 and the photo pickup device 122, no light will be received by the pickup device 122 when the movable member 132 is moved away from the common document path, which movement will be described hereinafter. The light source 120 and the photo pickup device 122 shown in the center portion of FIGURE 3, serves to detect the presence of a document which would be deposited in the next following output hopper by deflection of the gate 118 shown at the extreme right of the FIGURE 3. This arrangement will be intuitively clear since it is obvious that the presence of the check must be detected before the arrival of the document at the deflecting gate 118 associated with the desired pocket in which the check is to be deposited.

A document jam detector 130 is positioned along the common document path to detect the occurrence of a document jam. The description of the document jam mechanism 130 will be reserved for the discussion pertaining to the FIGURES 5, 6 and 7. Briefly, the jam detecting mechanism 130 comprises a movable jam plate 140 which is supported on a bracket 142 by a pin 146. Positioned next to the jam plate 140 is an electrical switch 148. A jammed check will cause the jam plate 140 to be pivoted about the pin 146 and against the actuating member of the switch 148, which switch will then signal on its output conductors that a jam has occurred which immediately results in actuation of a solenoid to cause the carriage forming one side of the common document way or path to open.

As shown in the FIGURE 3, a rotary solenoid 150 having electrical output leads 152 is coupled to mechanical linkage 154 to cause the movable member 132 to be moved upwardly, thus opening the document path. A mechanical operating knob 156 is connected to the mechanical linkage 154, which will be discussed in detail with reference to the FIGURE 4. Upon detection of a jam, the switch 148 will be actuated and close a circuit thus providing a signal to the electrical leads 152 to the solenoid 150 to cause the movable member 132 to move upwardly and thus open the document path and inhibit the feeding and transportation of the documents along the common document path.

An elevation view in section of the document path and the movable carriage elements are shown in the FIGURE 4. The function of the device in FIGURE 4 is to form one side of the document path and, upon command, move outwardly and open the document path to prevent the further feeding of documents. The movable elements or carriage may be opened manually by actuation of the manual operating knob 156 or by the application of an electrical signal on the leads 152 of the rotary solenoid 150.

The base member 128 is the main supporting base for the entire sorting system. One side of the document path, which does not move, is formed by the perpendicular and vertical member 158 which has a portion removed to permit a pulley 160 to extend therethrough and slightly into the document path. The flexible belt 102 is positioned against the pulley 160. The pulley 160 is supported by any suitable supporting means 162 upon the base member 128. The movable elements of the carriage comprise the elements above the base member 128 and to the left of the document 76. It will be understood that the pulley 160 and the belt 102 also move out only in a rotary member. The movable elements are shown in cross-section in the closed position and in dotted outline in the open position. The base or movable member 132 of the carriage is supported above the base member 128 by a bearing surface 164 which may be a flat plastic material. The movable member 132 has an extending portion 166 which forms the lower portion of the movable document path and supports a pulley 168. A belt 100 is positioned against the pulley 168 and into frictional engagement with the document 76. The belt 100 is driven by the frictional engagement of the belt 102 or the document 76. Supported by any suitable means above the pulley 168 and extending along the entire length of the carriage is a transparent member 170. The transparent member 170 is hinged and biased in a vertical position by the biasing means 172. The transparent member 170 may be rotated in a counterclockwise direction, as shown, to inspect the document path or to clear document jams. A tapped cylinder standoff 174 is supported vertically on the base member 132 by the bolt 176 whose head is recessed into the base member 132 by the slot 178. A cover 180 having a horizontal portion and a vertical portion is placed over the elements of the carriage and supported by a bolt 182 through a hole in the cover 180 to engage the standoff 174. The cover 180 serves as a dust cover and a safety device for housing moving parts.

As shown best in the FIGURES 3 and 4, there are four guide bolts 184 which move within slots 186, which slots 186 are formed in the base member 128. The bolts have their heads extending below the surface of the base member 128 and pass through the member 128 and are tapped into the lower portion of the movable base member 132, as shown. The bolts 184 and the slots 186 serve as an alignment means for insuring the constancy of the document way or path.

A post 188 extends downwardly and perpendicular to the base member 128 and is secured at its upper end to the movable member 132. The post 188 moves in a slot 190 formed in the base member 128.

The manual operating lever 156 passes through a slot 192 formed in the base member 128 and pivots about a pin 194. The pin 194 is rigidly secured by the securing means 196 to the upper side of the base member 128. An arm 198 extends from the lower side of the operating lever and forms an angle of approximately 135 degrees. A link 200 connects the lower end of the post 188 with the arm 198. The post 188 and its connecting linkages 198 and 200 are biased in an off-center locked position by a spring 200 which is connected to one end of a post 204 whose other end is threaded into the lower side of the base member 128. A plate 206 extends downwardly from the base member 128 and supports the solenoid 150. The rotary solenoid 50 has a shaft 208 which is connected to a finger 210. The finger 210 engages a triangular element 212 which is rigidly secured to the arm 198. It will be noted that the normal closed position of the carriage will cause the arm 198 and the line 200 to be positioned in an off-center manner. An electrical signal applied to the leads 152 of the solenoid 150, will cause counterclockwise rotation of the shaft 208, forcing the finger 210 in a similar counterclockwise manner and urge the element 212, coupled to the arm 198, downwardly and rearwardly and cause these elements, and the operating lever 156, to rotate about the pin 194. This action results in a movement of the entire carriage mechanism to the left. This open position is shown by the same reference numerals with the prime identification. Thus, the opened position of the carriage is shown with the cover 180 labeled 180′, the operating lever 156 as 156′, etc.

After the document jam has been cleared, the carriage may be "reset" or returned to its closed position by a manual restoring force applied to the operating lever 156′.

The jam detecting mechanism is shown in detail in the plan view of FIGURE 5. The same reference numerals are used in the FIGURE 5 as shown in the similar elements of the FIGURE 3. The common document path in the FIGURE 5 extends below the pulleys 168 and upon the pulley 116. The deflecting member or gate 118 is shown in a partially open condition and in dotted outline at 118′ in its fully opened position. As shown in the FIGURE 6, which is a sectional view taken along the lines 6—6 of the FIGURE 5, the base member 128 has a perpendicular vertical extending portion 214 extending therefrom. As shown in the FIGURE 7, which is a sectional view taken along the lines 7—7 of the FIGURE 6, the vertical extending portion 214 supports the bracket 142. The bracket 142 is substantially U-shaped with a portion removed to receive the electrical switch 148. The bracket 142 is secured to the member 214 by the bolts 216 of the FIGURES 6 and 7. A small angle bracket 218 is secured by bolts 220 to the bracket 142. The remaining flat portion of the angle bracket 218 is used to support the switch 148 by the bolts 222. The switch 148 extends through the bracket 142 and has an actuating member 224 (FIGURES 5, 6 and 7) in engagement with the jam plate 140.

The jam plate 140 is mounted for rotational movement about the pin 146 between the pulleys 168 of the FIGURES 5 and 6. The leading edge of the jam plate 140 is beveled and the trailing edge of the jam plate 140 is recessed at 226 to receive the two extending arms 228 from the bracket 142. A notch 230 is formed in the bracket 140 to receive the gate 118 when it is in its extended or open position. Thus, the bracket 142, the angle bracket 218 and the switch 148 are rigidly secured while the jam plate 140 is permitted to move about the pin 146.

In the FIGURE 5, the gate 118 is shown in a partially open condition which is causing the mutilation of a document 76. As the flexible belt 100 and 102 force the document 76 toward the gate 118, the crumbling action of the document 76 will cause the jam plate 140 to be actuated in a clockwise movement about the pin 146. The displacement of the jam plate 140 from its normal position, will depress the actuating member 224 of the switch 148 and thus close the electrical circuit between the output conductors 232 from the switch 148. This signal on the conductors 232 may be utilized to actuate the solenoid 150 thus forcing the carriage mechanism outwardly and opening the document path. In addition, the electrical signal on the conductors 232 of the FIGURE 5 may be applied to the "inhibit" input of the drive means 98 of the FIGURES 1 and 2 which results in the removal of the driving power to the various elements of the sorter. This instant release of the movable carriage and resulting stopping of the document sorter system prevents the further mutilation of documents in the case of a check jam. In most instances, a check jam is not caused by the elements of the sorting system but by the condition of the document itself. The document sorting system of the present invention will continuously read and sort the documents into the desired pockets and check jams will usually occur only when the condition of the check is such that it cannot pass through the document system. If a check is torn, mutilated, stapled or paper clipped or fails to properly engage the flexible belts so that timing is lost, document jams may occur.

The gate utilized in the present invention for diverting the documents from the common document path to the secondary path leading to an output pocket is shown in detail in the FIGURES 8, 9, 10, 11 and 12. The plan view of FIGURE 8 shows the deflecting member 118 extending through the key-shaped aperture 134 in the base member 128. The deflecting member 118 is shown in its closed position in solid outline and in its open position in broken outline as indicated at 118'.

As shown best in the FIGURE 9, the deflecting member 118 extends perpendicularly and vertically from the base member 128 and is of cantilever construction. The deflecting member 118 may be constructed of plastic or aluminum or any light material which will remain substantially rigid during operation, and which reduces the inertia or force required to actuate the gate to cause the deflection of a document from the common document path.

The gate, as shown in the FIGURE 9, comprises a cylindrical shaft housing 250 having a portion of wider diameter at 252. This flanged portion 252 is utilized to secure the shaft housing 250 to the lower side of the base member 128.

It will be understood that the entire gate is assembled before being placed into service. After the gate is completely assembled, the deflecting member 118 is inserted from under the base 128 into the key-shaped aperture 134 in the base member 128 with the flanged portion 252 against the lower side of the base member 128. Bolts 254 are utilized to join the gate to the base member 128. As shown in the FIGURE 10, the extended slots 256 are formed in the flanged portion 252 of the shaft housing 250, which slot 256 permits adjustment and proper positioning of the deflecting member 118 along the common document path shown in the FIGURE 3.

The shaft housing 250 of the FIGURE 9 is hollow and has a recessed portion 258 formed at its upper end which receives and supports the upper bearing 260. A lower bearing 262 is positioned within the removed portion of the shaft housing 250. The upper bearing 260 and the lower bearing 262 support a shaft 264. The shaft 264 is connected at its upper end to the vertical deflecting member 118 by insertion into a hole formed in the lower part of the deflecting member 118 and being secured thereto by a pin 266.

The deflecting member 118 is driven through the shaft 264 by a rotary solenoid 268 having a pair of conductors 270 connected thereto. As noted, the deflecting member 118 is driven by a rotary solenoid and means must be provided to secure the shaft from the solenoid to the shaft 264 as well as to some rigid elements such as the shaft housing 150. In addition, means must be provided to limit the rotational movement of the solenoid shaft.

A mounting plate 272, having an aperture formed therein equal to the diameter of the aperture in the shaft housing 250, is suitably secured to the lower portion and in alignment with the shaft housing 250. The diameter of the mounting plate 272 is somewhat larger than the diameter of the shaft housing at the portion at which they join so that means may be connected to the mounting plate 272 to support the solenoid 268 and its limit means. As shown in the FIGURE 9, a bolt 274 is supported vertically and parallel to the shaft 264 and connected to the mounting plate 272 in the area where the mounting plate 272 extends beyond the shaft housing 250. The bolt 274 has a removable head 276 which secures a torque arm 278 thereto. The torque arm 278 is best shown in the FIGURE 11 and is a bifurcated element having its leg extending at substantially 90 degrees to the general direction of the bifurcated elements. The function of the torque arm 278 is to provide a mounting for the solenoid 268 and still permit a small amount of axial movement of the solenoid 268. This is accomplished by constructing the torque arm 278 of some resilient material which will still permit the axial movement of the solenoid generated as a result of actuation of the solenoid 268. An aperture is provided in each of the ends of the torque arm 278. The extending portion of the torque arm is secured by the bolt 274 and the head 276 while the bifurcated elements are connected to the solenoid 268 by the bolts 280. A shaft 282 extends from the solenoid 268 and into a recessed portion formed in the lower part of the shaft 264. A stop arm 284 has a circular portion with an aperture formed therein whose diameter is equal to the diameter of the shaft 264. The stop arm 284 has an extending finger which extends into a stop 286 which is secured to the mounting plate 272. The stop arm 284 is positioned on the shaft 264 with the shaft 264 passing through the aperture in the stop arm 284 and the shaft 282 from the solenoid 268 is then inserted into the aperture formed in the lower portion of the shaft 264. The assembly comprising the shaft 264, the shaft 282 and the stop arm 284 are then rigidly secured together by a pin 288 which is passed therethrough. As shown in the FIGURES 9, 11, and 12, the stop 286 is of substantially rectangular construction having a slot 290 formed therein for receiving the finger of the stop arm 284. The stop 286 is secured to the edge of the circular mounting plate 272 by the mounting screws 292. In the FIGURE 12, the finger of the stop arm 284 is shown extending through the slot 290 of the stop member 286, which stop member 286 is secured to the mounting plate 272. It will be understood that the mounting plate 272 may take a shape such as circular, square or rectangular if such is desired.

After the gate is assembled as hereinbefore described, the deflecting member 118 is passed through the key-shaped aperture 134 formed in the base member 128. Bolts 254 are then passed through the apertures formed in the flange portion 252 of the shaft housing 250 and into tapped holes in the underside of the base member 128. The bolts 254 are then tightened only enough to fit snugly against the underside of the base member 128 and still permit movement between the base 128 and the flanged portion 252. The shaft housing 250, and the flanged portion 252, are then rotated (which rotation is permitted by the slots 256 formed in the member as shown in the FIGURE 10) for adjusting and positioning the deflecting member 118 along the document path as shown in the FIGURE 3. The electrical leads 270 from the solenoid 268 are then connected to the decoder 126 of the FIGURES 1 and 2.

FIGURES 13 and 14 show one of the document turn-over and transport means of a secondary document path. As the document leaves the common or primary document path, it is in a vertical position and must be rotated 90 degrees before being presented to the high speed stacking device. This rotation of the document is accomplished by the lower and upper document guides 110 and 112, respectively, positioned adjacent the belt transport system of each of the secondary document paths leading to an output hopper.

As shown in the plan view of FIGURE 13 and the elevation view of FIGURE 14, the main supporting means comprises the base member 128 which supports a group of pulleys 300 forming one side of the document path. A flexible belt 302 passes over the pulleys and engages a similar belt 304, which belt 304 forms the other side of the document path and is maintained along the document path by pulleys 306. Either the belt 302 or the belt 304 may be driven through one of its associated pulleys and since these flexible belts are in frictional engagement, the other engaging belt will also be driven. In the particular embodiment shown, the belt 302 is driven. It will then be intuitively clear that if a document is inserted between the belts 302 and 304, the document will be transported by the belts along the secondary document path.

It will be noted in the FIGURES 13 and 14, that the terminal position or leftmost travel of the belts is controlled by a terminal pulley 308 which engages the belt 302 and the pulley 310 which engages the belt 304. It will be noted that the transport system comprising the belts and pulleys accepts the checks in a vertical position and through the aid of the guide members 110 and 112, form a terminal path which is positioned at 90 degrees to the positioning of the pulleys at the point where the documents are first received by the secondary document system. The belt system itself will serve to rotate the check through the required 90 degrees; however, the guides 110 and 112 assist in this operation and aid in registration of the documents and prevent the edges of long checks from becoming distorted and perhaps cause a document jam due to the excessively high speed at which the documents are required to travel in a high speed document sorting system.

The pulleys 300 and 306 are suitably mounted upon the base member 128 by suitable mounting supports which gradually provide the rotational path of 90 degrees of the flexible belts.

The mounting supports are such as those shown in the FIGURE 13 as 312. A clearer view of how a pulley would be supported upon the base member 128 is afforded by reference to the FIGURE 15. The FIGURE 15, which is a sectional view taken along the lines 15—15 of the FIGURE 13, shows the belt rotated at a point approximately 45 degrees from the vertical position. Additional pulleys will be positioned at greater angles so that the total 90 degree rotation of the document is accomplished when the document emerges from the secondary document path and is presented to the high speed stacker 314, best shown in the FIGURE 16.

Figure 15:
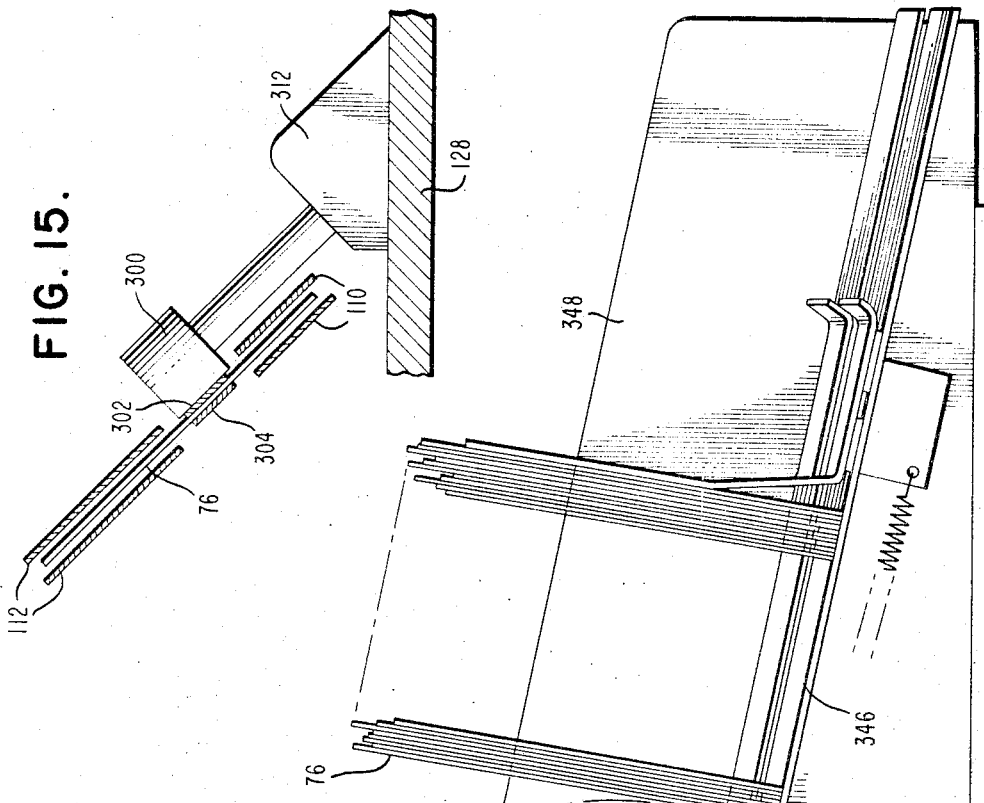
FIGURE 15 is a sectional view taken along the lines 15—15 of the FIGURE 13.

The FIGURE 15 shows the supporting means 312 upon the base member 128 and supporting a pulley 300. The belt 302 engages the pulley 300 and in the absence of a document, the belt 304 would engage the belt 302; however, as the document 76, shown in the FIGURE 15, is presented for stacking to the output pocket, then the document 76 is injected between the flexible belts 302 and 304 and is driven along the path formed by these belts. A lower guide 110 and an upper guide 112 are shown in the FIGURE 15 for guiding the document along its path.

The upper pulley 308 is supported upon a shaft 316 which shaft 316 is suitably journalled within the bearing support 318. Suitable rotary power may be applied to a pulley 320 which is coupled to the shaft 316 for providing rotational movement of the belt and pulley system. As shown in the FIGURE 14, pulleys 306 and 310 are supported by the arm bracket 322 which is positioned below the pulley 308. The flexible belt 304 traverses these pulleys.

The guide means, comprising a lower guide 110 and an upper guide 112, is positioned along the belt path for guiding the documents into the high speed stacker 314. Each of the guide members are similar in construction and the upper guide 112 will be considered in detail. The guide 112 is formed of substantially two rectangular sheets of material such as aluminum. The guide 112 must be bent or formed so that the exit point which directs documents into the high speed stacker 314, is turned or twisted at approximately 90 degrees to the entrance point. This twisting or bending may be accomplished by applying force at the points 324 as shown in the FIGURES 13 and 14 which results in the proper configuration. The leading edges of the members are rounded as at 326 to prevent documents engaging the edge and causing a jammed condition. After the two members are formed as shown, U-shaped channels 328 are positioned over an edge of the members and rigidly secured thereto. The guide 112 now formed of the two substantially rectangular members, which were bent or formed as shown in the drawings, and the U-shaped channels 328 forms a unitary body which when positioned along side the belt system of the secondary document path will cause and assist in a rotation of the document from a vertical position to a position which is parallel to the base member 128. The guide 112 is supported along the document path by a bracket 330 which is positioned by a standoff 332. In addition, a bracket 334 is secured to the base member 128 and to the guide 112 as shown. The brackets 330 and 334 may be adjustably mounted so as to permit a positioning of the guides 110 and 112 according to the document size that is to be accommodated. The guide 112 may be known as the upper guide in that it engages the upper portion of the check emerging from the primary or common document path. The guide 110, is constructed in a manner similar to the guide 112 and is supported similarly upon the base member 112. The guide 110 may be known as the lower guide member since it engages the lower portion of the check as it enters the secondary transport system. The guides 110 and 112, at their exit points to the high speed stacker 314, are horizontal and in a side-by-side relationship. The entrance point, as indicated, would be considered a side-by-side vertical relationship. The document guides 110 and 112 assist in registration of the documents in that they may be so positioned as to permit the lower edge of the document to emerge from the guides at substantially the same position.

FIGURE 16 shows the high speed stacker 314 and the flexible belts 302 and 304 transferring a document 76 into one of the slots 336 formed in the stacker 314. The high speed stacker 314 is supported by suitable mountings 338 and imparted rotational movement by a connected shaft 340. The timing of the rotational velocity of the high speed stacker 314 is such that a slot is available for insertion of a document as each document is discharged by the belts 302 and 304. As a document enters one of the slots 336, its linear speed is decreased and as the rotation of the stacker 314 continues, the document within the slot 336 will engage a finger 342 which extends into and between the plurality of discs forming the high speed stacker 314. The documents are then urged out of the stacker 314 by the finger 342 and neatly stacked as shown. The base member 346 of the output hopper 348 is slightly canted away from the horizontal so that registration of the documents is achieved by placing them in a neat and orderly arrangement so that it is not necessary to "jog" the documents before insertion into the high speed document sorter for subsequent passes through the system.

OPERATION

Documents to be sorted are placed in the input hopper 78 of the FIGURE 2 with the first document positioned against the pickup arm 82 and the last document engaging the backup plate 80. The drive means 98 are brought up to speed, and power is supplied to advance the backup plate 80; to cause the oscillatory movement and the required vacuum of the pickup arm 82; to drive the belts 84 and 86 through the pulley 96; to drive the belts 302 and 304 of the secondary belt systems; to cause rotation of the stacker 314 located adjacent each of the output hoppers; and, to drive any remaining belt systems. As the documents pass the magnetic reading head 94, a signal is induced in the head 94 which is transmitted to the decoder and pocket selector 126. The decoder 126 will select the pocket in which it is desired to place the document and when the document presence detector, comprising the light source 120 and the photo pickup device 122, detects that the check approaching the gate 118 associated with the desired output pocket, then the decoder 126 will provide a signal to actuate the rotary solenoid 268 (FIGURE 9) associated with the particular gate 118.

In the sorting routine shown in the FIGURE 2, gate "0" is shown as actuated and would receive the document approaching that gate. In the FIGURE 3, the middle gate is shown in its open or actuated position while the left and right gates are shown in their closed or non-deflecting positions.

If for some reason a document 76 strikes the gate 118 or other elements along the document way, the jam detectors would be actuated. The crumpling of the document 76 would cause the jam plate 140 (FIGURE 5) to be rotated about its pivot pin 146 and thus actuate the switch 148 through its actuating member 224. The switch 148 would then close a circuit which would cause the solenoid 150 of the FIGURE 4 to rotate the finger 210 in a counterclockwise manner which engages the element 212 and forces the carriage open by moving the base member 132 to the left. Since the elements forming the left side of the document path are mounted upon this base member 132, the document path would be open and thus prevent further mutilation of any documents. At the same time, the circuit on the conductors 232 from the switch 148 would be utilized to provide an inhibit signal to the drive means 98 of the FIGURES 1 and 2 which results in an immediate stopping of the sorting system. With the carriage of the FIGURE 4 now in its open position, the jammed document may be conveniently removed by urging the transparent member 170 about its hinged axis, which provides easy access to the document path. With the jammed document now removed the carriage may be placed in its normal position by moving the manual actuating lever 156' back to the position 156 which results in a closing of the document path. The system is now ready for operation in a manner hereinbefore described.

The means, which are provided at successive positions along the document path for diverting the document from the common document path into a secondary document path which leads to a stacker and the output pocket, is the document diverter or gate. If document jams are to be minimized and check mutilation reduced, the document gate must open quickly, divert the document from the common path to its output pocket, and then return to its closed position before the arrival of the next document. The deflecting member of the gate is coupled to one end of the shaft in a cantilever manner. The opposite end of the shaft is secured to a solenoid capable of rotational movement. The solenoid is connected to the housing and appropriate stops are provided to limit the rotational movement of the shaft. The gate is biased in a closed position by the elements within the solenoid. Upon actuation of the solenoid, the shaft will be rotated thus causing the diverting member of the gate to be moved from its closed position to its open position. Thus, the document is diverted to the desired output pocket. If a document gate becomes defective and the "down time" of the sorting system is to be minimized, a second gate may be quickly reinserted and installed in the document system and the operation continued.

As each document is diverted from the common or primary document path by a gate 118, the document strikes the deflecting member 138 (FIGURE 2) and is then transported by one of the secondary document paths shown in the FIGURES 13 and 14. The flexible belts 302 and 304 of one of the secondary paths transports the documents toward the high speed document stacker 314 and at the same time rotates the check from a substantially vertical position through 90 degrees to a substantially horizontal position. A pair of document guides 110 and 112 are positioned along and in conformity with the flexible belts to guide the outer edges of the document into the stacker. The guides 110 and 112 assist in the registration of the checks and prevent document jams in that the outer edges of the documents are unable to engage any elements which may result in a jammed document condition. The system will accommodate the narrowest of checks in addition to the much wider documents used in many European countries. The document guides 110 and 112 are simple in construction yet reliable and admirably serve the function to which they are intended. As shown in the FIGURE 14, the discharge end of the guides 110 and 112 are curved slightly upward which directs the document into one of the slots 336 of the high speed stacker 314. The rotation of the stacker 314 will deposit the documents in the output hopper 348 as indicated in the FIGURE 16.

Thus, there has been described a system for automatically sorting documents such as bank checks. As the documents are individually and successively advanced past a magnetic reading station, the magnetic numbers formed on the face of the check are interpreted and the document is directed to an output pocket according to the magnetic code placed thereon. High speed document sorters will operate and sort checks at upward of 1800 documents per minute. When operating at these high speeds, it is necessary that all elements of the mechanical, as well as the electrical, systems be designed to preserve the condition of the documents and to eliminate or reduce document jams. If a document jam does occur in the system, means are provided to instantaneously inhibit the operation of the check sorting system and discharge the document from the document path.

All elements of the system have been designed for high speed operation. The documents are controlled and positively gripped during its entire passage through the check sorter and not allowed to "float" at any time. A floating document tends to slow down and increase the possibility of document jams and the resulting mutilation of otherwise sortable documents.

While the form of the document sorting system which is herein shown and described is adapted to fulfill the objects primarily stated, it is to be understood that it is not intended to confine the invention to the one form or embodiment herein disclosed, for it is susceptible of embodiment in various other forms, all coming within the scope and intent of the invention.

What is claimed is:

1. A document sorting system for classifying character bearing documents according to the data recorded thereon comprising means for supporting the character bearing documents, means positioned adjacent said means for supporting for extracting and advancing documents along a primary document path, means comprising a belt arrangement forming secondary document paths positioned along the primary document path for transporting and rotating said documents in which said documents are physically transported by said belt arrangement, document diverting means cooperating with said means forming secondary document paths, one diverting means per secondary path, for diverting documents from the primary path to one of the secondary paths, and means connected to each secondary path for receiving the sorted documents.

2. A document sorting system for classifying character bearing document according to the data recorded thereon comprising means for supporting the character bearing documents, document extracting means positioned adjacent said means for supporting, means cooperating with said means for extracting for advancing the documents along a common document path, a plurality of document diverting means positioned along the common path, document belt transport means forming secondary document paths and juxtaposed each diverting means, said documents being physically transported by said belt means, one document belt transport means per document diverting means, individual means cooperating with each document belt transport means forming the secondary path for rotating the documents through an angle of approximately 90°, and means positioned at the discharge area of each document transport means for receiving the rotated documents for performing a stacking operation.

3. A document sorting system for classifying character bearing documents according to the data recorded thereon comprising means for supporting character bearing documents, means positioned adjacent said means for supporting for extracting documents from said means, means for advancing extracted documents along a common document path, means juxtaposed the common document path for reading documents and generating an output signal characteristic of the data recorded thereon, means for receiving the output signal of said reading means to determine the sorting routine of the documents, a plurality of document diverters positioned along the document path succeeding said reading means, belt transport means positioned adjacent each document diverter for receiving deflected documents, said last mentioned means forming a secondary document path for transporting and rotating documents, said documents being physically transported by said belt means, means for receiving the rotated documents and performing a stacking operation, and means coupled between said means for receiving the output signal and said document diverters for permitting actuation of one of said document diverts according to the determined sorting routine.

4. The combination as defined in claim 3 wherein said means positioned adjacent each document diverter for receiving deflected documents includes a pair of guide means and a belt transport means, said guide means cooperating with said belt transport means for rotating documents from a substantially vertical position to a substantially horizontal position.

5. A document sorting system for classifying character bearing documents according to the data recorded thereon comprising means for supporting character bearing documents, means positioned adjacent said means for supporting for extracting documents from said means, means for advancing extracted documents along a common document path, means juxtaposed the common document path for reading documents and generating an output signal characteristic of the data recorded thereon, means for receiving the output signal of said reading means to determine the sorting routine of the documents, a plurality of document diverters positioned along the document path succeeding said reading means, each of said document diverters comprising a shaft, a deflecting member supported by said shaft and in a cantilever manner, and a solenoid coupled to said shaft for imparting rotary motion to said shaft, belt transport means positioned adjacent each document diverter for receiving deflected documents, said last mentioned means forming a secondary document path for transporting and rotating documents, wherein said documents are physically transported by said belt means, means for receiving the rotated documents and performing a stacking operation, and means coupled between said means for receiving the output signals and said solenoids of said document diverters for permitting actuation of one of said document diverters according to the determined sorting routine.

6. A document sorting system for classifying character bearing documents according to the data recorded thereon comprising means for supporting character bearing documents, means positioned adjacent said means for supporting documents for extracting documents from said means, means for advancing extracted documents and forming one side of a common document path, a slidable carriage positioned along and forming the other side of the common document path, a plurality of document gates positioned along the common document path for deflecting, upon command, character bearing documents, and means forming a secondary document path leading from each document gate, said last named means including a belt transport system for rotating documents from a substantially vertical position to a substantially horizontal position, and a lower U-shaped guide and an upper U-shaped guide supported along each belt transport system and enclosing the documents and cooperating in the rotation of the documents by conforming to the path formed by the document as advanced by said belt transport system.

7. A document sorting system for classifying character bearing documents according to the data recorded thereon comprising means for supporting character bearing documents, means positioned adjacent said means for supporting documents for extracting documents from said means, means for advancing extracted documents and forming one side of a common document path, a slidable carriage positioned along and forming the other side of the common document path, document jam detecting means positioned along the common document path, means coupling the output of said jam detecting means to said slidable carriage for actuating said carriage to expand the document path upon the occurrence of a jam as indicated by said detecting means, a plurality of document gates positioned along the common document path for deflecting, upon command, character bearing documents, and means forming a secondary document path leading from each document gate, said last named means including a belt transport system for rotating documents from a substantially vertical position to a substantially horizontal position, and a lower U-shaped guide and an upper U-shaped guide supported along each belt transport system and enclosing the documents and cooperating in the rotation of the documents by conforming to the path formed by the document as advanced by said belt transport system.

8. A document sorting system for classifying character bearing documents according to the data recorded thereon comprising means for supporting character bearing documents, means positioned adjacent said means for supporting documents for extracting documents from said means, means for advancing extracted documents and forming one side of a common document path, a slidable carriage positioned along and forming the other side of the common document path, a plurality of document gates positioned along the common document path for deflecting, upon command, character bearing documents, each of said gates comprising a shaft, a deflecting member supported upon said shaft in a cantilever manner, and a solenoid coupled to said shaft for providing rotational movement thereto, means for reading the character bearing documents and for actuating one of said document gates through said solenoid according to the characters upon the document, and means forming a secondary document path leading from each document gate, said last named means including a belt transport system for rotating documents from a substantially vertical position to a substantially horizontal position, and a lower U-shaped guide and an upper U-shaped guide supported along each belt transport system and enclosing the documents and cooperating in the rotation of the documents by conforming to the path formed by the document as advanced by said belt transport system.

9. A document sorting system for classifying character bearing documents according to the data recorded thereon comprising means for supporting character bearing documents, means positioned adjacent said means for supporting documents for extracting documents from said means, means for advancing extracted documents and forming one side of a common document path, a slidable carriage positioned along and forming the other side of the common document path, document jam detecting means positioned along the common document path, means coupling the output of said jam detecting means to said slidable carriage for actuating said carriage to expand the document path upon the occurrence of a jam as indicated by said detecting means, a plurality of document gates positioned along the common document path for deflecting, upon command, character bearing documents, each of said gates comprising a shaft, a deflecting member supported upon said shaft in a cantilever manner, and a solenoid coupled to said shaft for providing rotational movement thereto, means for reading the character bearing documents and for actuating one of said document gates through said solenoid according to the characters upon the document and means forming a secondary document path leading from each document gate, said last named means including a belt transport system for rotating documents from a substantially vertical position to a substantially horizontal position, and a lower U-shaped guide and an upper U-shaped guide supported along each belt transport system and enclosing the documents and cooperating in the rotation of the documents by conforming to the path formed by the document as advanced by said belt transport system.

10. A document sorting system for classifying character bearing documents according to the data recorded thereon comprising means for supporting character bearing documents, means positioned adjacent said means for supporting documents for extracting documents from said means, means for advancing extracted documents and forming one side of a common document path, a slidable carriage positioned along and forming the other side of the common document path, a magnetic reading head juxtaposed the document path for producing an output signal characteristic of the data recorded on the documents, a plurality of document gates positioned along the common document path for deflecting, upon command, the character bearing documents, a document presence detector positioned forward each document gate for generating a signal coincident with the arrival of a document, a decoder for receiving the output signal of said reading head and said presence detector for actuating one of said document gates, and means forming a secondary document path leading from each document gate, said last named means including a belt transport system for rotating documents from a substantially vertical position to a substantially horizontal position, and a lower U-shaped guide and an upper U-shaped guide supported along each belt transport system and enclosing the documents and cooperating in the rotation of the documents by conforming to the path formed by the document as advanced by said belt transport system.

11. The combination as defined in claim 10 including jam detecting means positioned adjacent the document path and coupled to actuate said slidable carriage upon the occurrence of a document jam condition.

References Cited
UNITED STATES PATENTS

| | | | |
|---|---|---|---|
| 2,994,428 | 8/1961 | Daubendick | 209—111.8 |
| 3,022,907 | 2/1962 | Palasciano | 214—11 |
| 3,067,886 | 12/1962 | Frederick | 214—11 |
| 3,087,612 | 4/1963 | Duncan | 209—110 X |
| 3,108,694 | 10/1963 | Crain et al. | 209—111.8 |
| 3,137,499 | 6/1964 | Maidment | 271—71 |

DARYL W. COOK, *Acting Primary Examiner.*

MAYNARD R. WILBUR, JOHN F. MILLER,
*Examiners.*

G. MAIER, *Assistant Examiner.*